(12) United States Patent
Stallinga

(10) Patent No.: US 7,391,700 B2
(45) Date of Patent: Jun. 24, 2008

(54) OPTICAL STORAGE IN DISCS HAVING MULTIPLE DATA LAYERS

(75) Inventor: Sjoerd Stallinga, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 234 days.

(21) Appl. No.: 10/577,898

(22) PCT Filed: Oct. 26, 2004

(86) PCT No.: PCT/IB2004/003526

§ 371 (c)(1), (2), (4) Date: May 1, 2006

(87) PCT Pub. No.: WO2005/043513

PCT Pub. Date: May 12, 2005

(65) Prior Publication Data

US 2007/0109941 A1    May 17, 2007

(30) Foreign Application Priority Data

Nov. 4, 2003   (EP) ................................. 03300196

(51) Int. Cl.
*G11B 3/74*   (2006.01)

(52) U.S. Cl. ..................... 369/94; 369/112.02

(58) Field of Classification Search ..............................
369/112.01–112.08, 275.1, 275.2, 275.3,
369/275.4, 275.5, 94, 286; 428/64.4, 817,
428/913
See application file for complete search history.

(56) References Cited

U.S. PATENT DOCUMENTS

| 5,202,875 | A | * | 4/1993 | Rosen et al. ................... 369/94 |
| 5,255,262 | A | * | 10/1993 | Best et al. ................. 369/275.1 |
| 6,385,157 | B1 | * | 5/2002 | Nakano .................. 369/112.02 |
| 7,082,093 | B1 | * | 7/2006 | Magnitskii et al. ............ 369/94 |

* cited by examiner

*Primary Examiner*—Ali Neyzari
(74) *Attorney, Agent, or Firm*—Michael E. Belk

(57) ABSTRACT

Optical pick-up apparatus for retrieving data stored on an optical storage disc having a plurality of record layers (6, 7), the radiation beam reflected back from the disc when a first layer (7) is irradiated comprising radiation reflected back from the first layer (7) and radiation reflected back from one or more of the other layers(6). A spatial filter (8) is provided which is arranged and configured to spatially filter the radiation beam so as to cause the radiation reflected by the first record layer (7) and the radiation reflected by any of the other record layers (6) of the optical storage disc to be spatially separated, such that at least a substantial portion of the radiation reflected back from the other layers (6) can be selectively eliminated from the radiation beam prior to retrieval therefrom of the data.

10 Claims, 3 Drawing Sheets

OPTICAL STORAGE IN DISCS HAVING MULTIPLE DATA LAYERS

Figure 1:
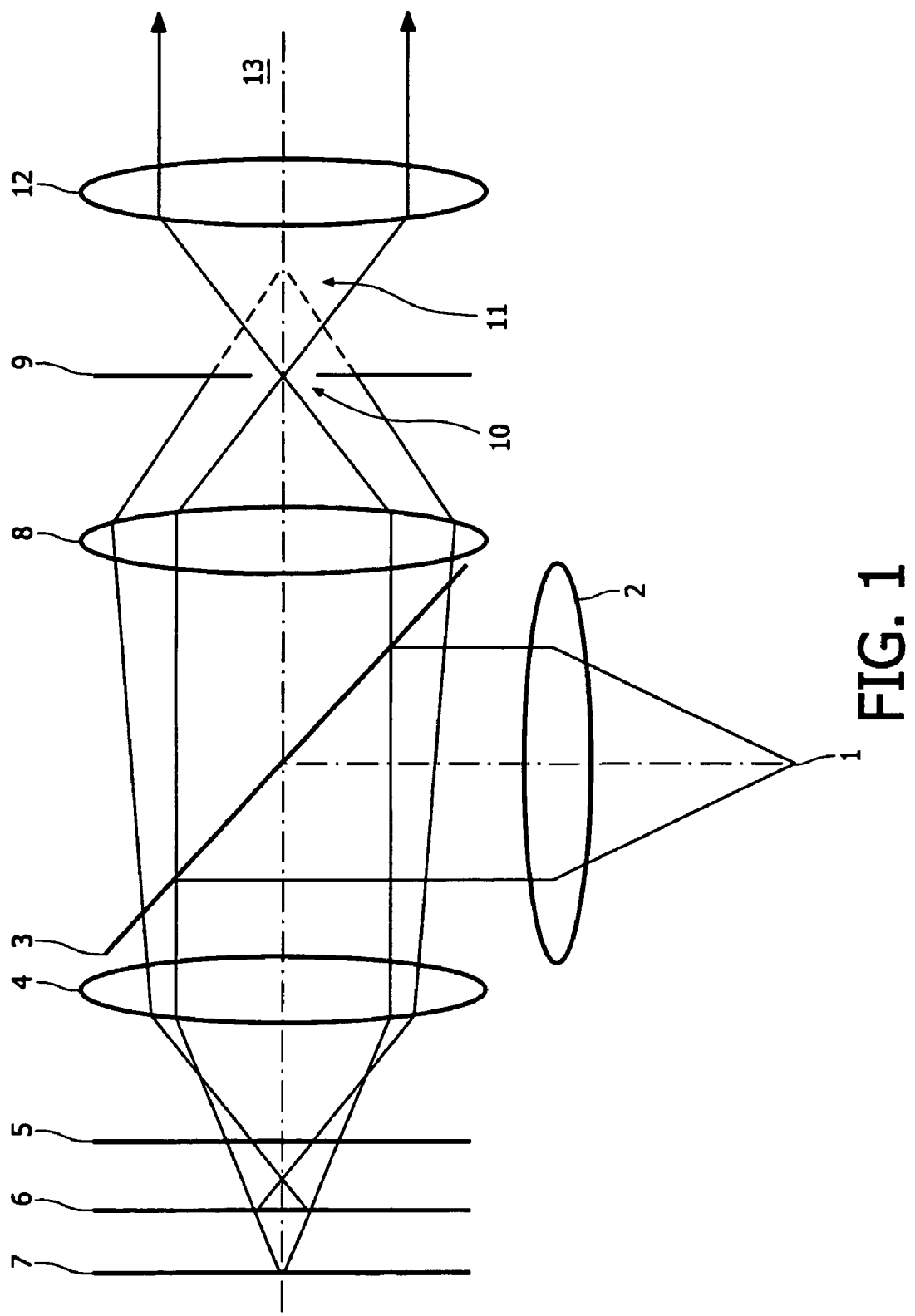

This invention relates generally to optical data storage systems and, more particularly, to an apparatus for reading data stored on a disk having multiple data storage surfaces, i.e. layers.

Optical data storage systems provide a means for storing great quantities of data on a disk. The data is accessed by focussing a laser beam onto the data layer of the disk and then detecting the reflected light beam. In one known system, data is permanently embedded as marks, such as pits, in the disk, and the data is detected as a change in reflectivity as the laser beam passes over the marks.

Erasable optical systems are also known. These systems generally use a laser to heat the data layer above a critical temperature in order to write and erase data. Magneto-optical recording systems record data by orienting the magnetic domain of a spot in either an up or a down position. The data is read by directing a low power laser to the data layer. The differences in magnetic domain direction cause the plane of polarisation of the light beam to be rotated one way or the other, clockwise or anti-clockwise. This change in orientation of polarisation is then detected. Phase change recording uses a structural change of the data layer itself (amorphous and crystalline are two common types of phases) to record the data. Such data is detected as changes in reflectivity as a beam passes over the different phases.

Advances in computer technology call for increased memory capacity. The optical disk, as a two-dimensional optical storage device, is currently the most widespread physical format for optical storage. The data capacity of optical disks can be increased by adding a third physical dimension. This can be done by using a multilayer optical disk, i.e. by axially stacking a number of information layers in a single optical disks. An optical disk having two or more data layers may in theory be accessed at different layers by changing the focal position of a lens.

Several stacked optical disk systems have been proposed, for example, in U.S. Pat. Nos. 5,202,875 and 5,255,262, in which a volumetric method for increasing optical disk capacities is disclosed which involves bonding together individual disks in a stack with spacers being provided between adjacent disks to define a gap therebetween. At any one time, a movable lens in the optical disk drive focuses a laser on one surface of one of the disks in order to read data. The focus of the laser is changed repeatedly to sequentially read data from the various disk surfaces. Each disk, or at least all but the disk furthest from the laser source, must be partially transparent so that the laser can be used to read a disk that lies beyond one or more other disks. Each disk surface, however, must also be sufficiently reflective to allow the data to be read.

However, by increasing the number of disks, the signal to noise ratio (SNR) is generally reduced and the inter-layer cross-talk becomes significant. When the scanning spot is focused at layer I of M layers, a main portion of the light will be reflected by layer I and collected by the detector. A second, spurious portion of the light will be reflected by the other M−1 data layers and will also (partly) be collected by the detector. This spurious portion will be added to the main portion and has the adverse effect of deteriorating the read-out signal as well as the error signals used to keep the scanning spot in focus on track. For a dual layer disc (M=2), such adverse effects are relatively small, but for multilayer discs (>2), they become increasingly severe, and there is obviously a need for some means of suppressing this layer-to-layer cross-talk for multilayer discs.

Thus, in accordance with the present invention, there is provided a data retrieval apparatus for retrieving data stored on an information record medium having a plurality of record layers, the apparatus comprising means for irradiating a first record layer with electromagnetic radiation, a detector for receiving an electromagnetic radiation beam reflected back from said information record medium and for retrieving said data therefrom, said radiation beam comprising radiation reflected back from said first layer and radiation reflected back from one or more of the other layers of the information record medium, the apparatus further comprising spatial filter means arranged and configured to spatially filter said radiation beam so as to cause the radiation reflected by said first record layer and said radiation reflected by any of the other record layers of the information record medium to be spatially separated, and means for selectively eliminating at least a substantial portion of said radiation reflected back from said other record layers from said radiation beam prior to retrieval therefrom of said data.

Thus, in accordance with a first exemplary embodiment of the present invention, the use of spatial filtering means enables the active and precise focussing of the main and spurious reflections to two or more respective focal points, such that means may be provided to ensure that at least most of the radiation used by the detector to retrieve the data recorded on the first record layer comprises the radiation reflected from that record layer. More specifically, the spatial filter means may comprise an optical element, such as a lens, arranged and configured to converge the radiation reflected by the first record layer to a first focal point and the radiation reflected back from the one or more record layers to one or more respective second focal points, different from said first focal point.

In one preferred embodiment, obstruction means may be provided in the radiation transmission path between the spatial filter means and the detector. Such obstruction means may comprise a screen having an aperture therein, the screen being located such that the aperture is at or adjacent to the first focal point, such that the radiation reflected back from the first record layer is permitted to pass through the aperture to the detector and at least a substantial portion of the radiation reflected back to the one or other record layers is prevented from being transmitted to the detector by the screen.

Alternatively, the obstruction means may be located at or adjacent the or each second focal point such that radiation reflected back from the respective one or more other record layers is prevented from being transmitted to the detector, whereas the radiation reflected back from the first record layer is permitted to be transmitted to the detector.

In yet another embodiment, the detector may be divided into at least two segments, and arranged and configured such that a main portion of the spatially filtered radiation beam consisting of radiation reflected back from the first record layer is incident only on a first segment of the detector, and another portion of the spatially filtered radiation beam consisting of radiation reflected back from the one or more other record layers is incident on at least the first and a second segment of the detector. In this case, a substantial portion of the radiation reflected back from the other record layers can be eliminated by calculating a first radiation intensity signal in respect of the first segment and a second intensity signal in respect of the second segment, and subtracting the second intensity signal from the first integrity signal.

In all cases, a collimator element is beneficially provided in the radiation transmission path between the first focal point and the detector for collimating the radiation beam prior to transmission thereof to the detector.

The invention further extends to a method of retrieving data stored on an information record medium having a plurality of record layers, the method comprising irradiating a first record layer with electromagnetic radiation, receiving an electromagnetic radiation beam reflected back from said information record medium and retrieving said data therefrom, said radiation beam comprising radiation reflected back from said first layer and radiation reflected back from one or more of the other layers of the information record medium, the method further comprising spatially filtering said radiation beam so as to cause the radiation reflected by said first record layer and said radiation reflected by any of the other record layers of the optical storage disc to be spatially separated, and selectively eliminating at least a substantial portion of said radiation reflected back from said other record layers from said radiation beam prior to retrieval therefrom of said data.

These and other aspects of the present invention will be apparent from, and elucidated with reference to, the embodiments described herein.

Figure 2:
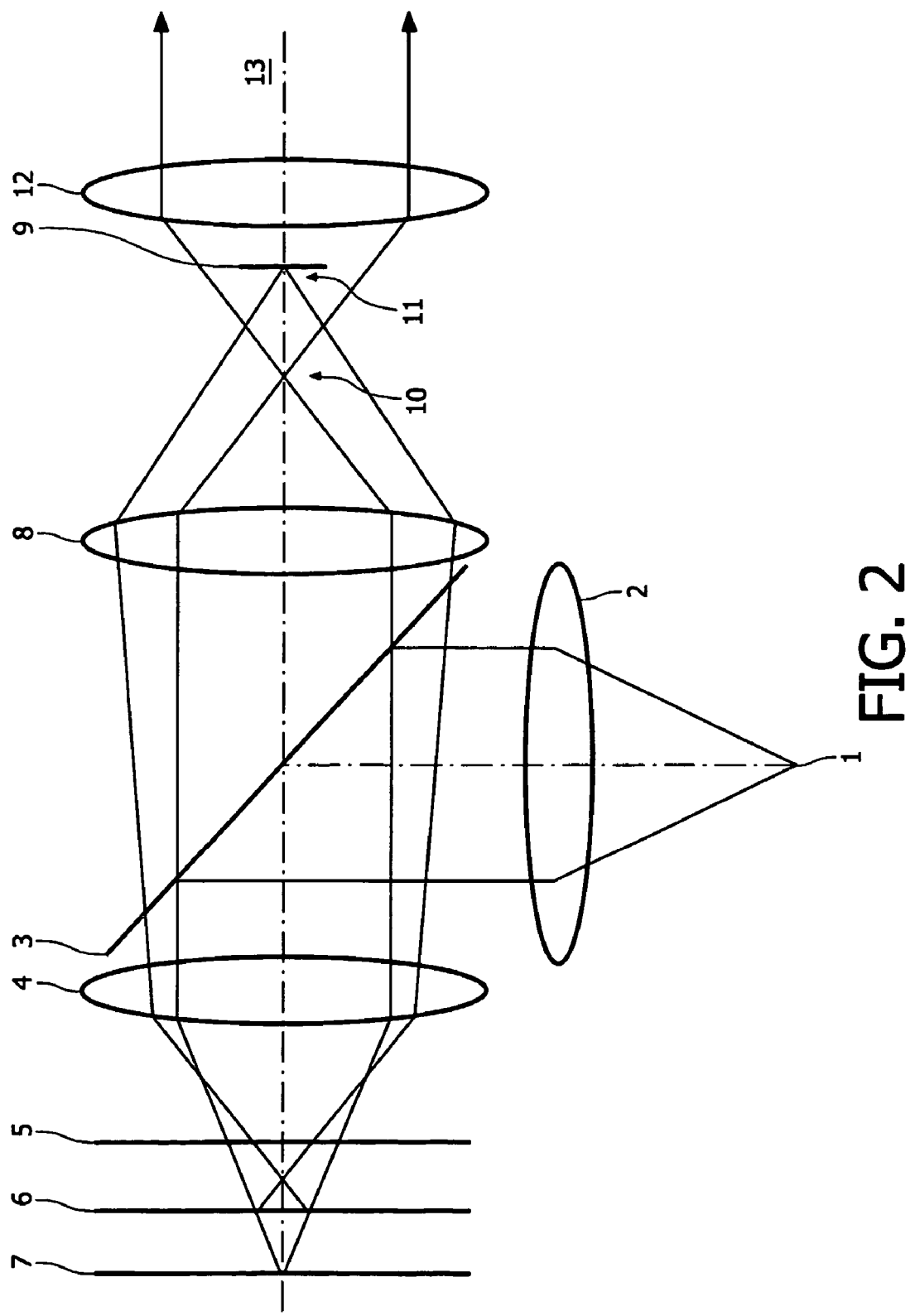
Figure 3:
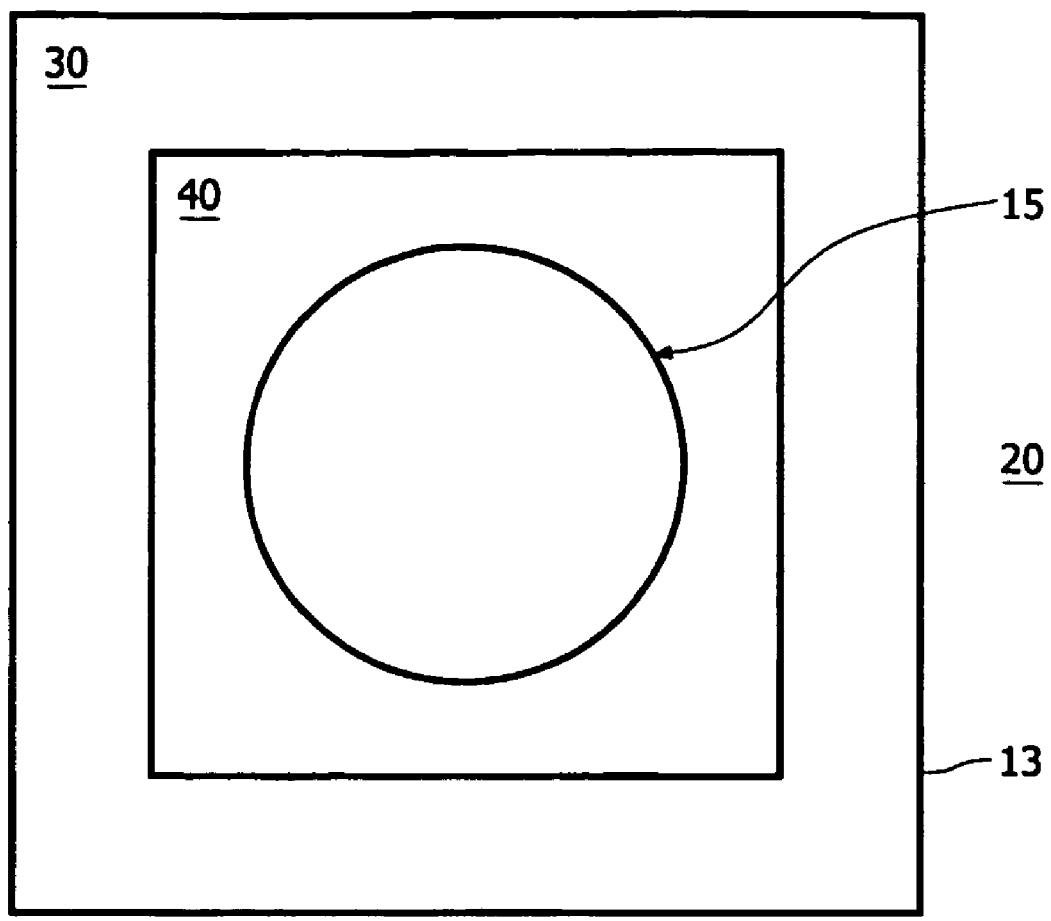

Embodiments of the present invention will now be described by way of examples only with reference to the accompanying drawings, in which:

FIG. 1 is a schematic partial illustration of an apparatus according to a first exemplary embodiment of the present invention;

FIG. 2 a schematic partial illustration of an apparatus according to a second exemplary embodiment of the present invention;

FIG. 3 is a schematic illustration of a detector for use in an apparatus according to a third exemplary embodiment of the present invention.

U.S. Pat. No. 6,385,157 B1 describes an optical pick-up device for recording and reproducing information from an information record medium having plural record layers. Such an optical pick-up device comprises an outward route system in which a laser light from a semiconductor laser is collimated to form a light flux by a collimator lens, afterwards is reflected with a beam splitter and is irradiated on a multilayer optical disc by an objective lens, and comprises an inward route optical system in which the light reflected by the optical disc after being transmitted through the beam splitter and the objective lens is received on an optical detector through a diaphragm lens and a pin-hole, thereby reproducing the information recorded on the desired record layer.

However, if the diameter of the pin-hole is made too small then, although a significant proportion of spurious reflection is blocked from reaching the detector, so is a large proportion of the desired reflected light, such that the signals reaching the detector may be weak and the resultant information reproduced may be flawed. On the other hand, if the pin hole is made too large, then although most of the required reflected light passes to the detector, so does a large portion of the spurious reflections from other layers of the optical disc, which spurious reflection is added to the main reflection, and will have an adverse effect on the quality of the read-out signal as well as the error signals used to keep the scanning spot in focus and on track.

Thus, in U.S. Pat. No. 6,385,157 B1, it is proposed to select the radius of the pin-hole by ensuring that the following expression $V_p = 2\pi \cdot r/(\lambda/NA)$ satisfies the condition $3 < V_p < 6$, where r is the radius of the pin-hole, NA is lens aperture of the detection system, $\lambda$ is the wavelength of the laser light, and $V_p$ is the radius of Airy disc (see CONFOCAL MICROSCOPY (Wilson, T) 1990. ACADEMIC PRESS INC.)

Thus, the known arrangement described above effectively provides an expression which must satisfy a certain criterion in a range, in order to minimise the transmission of spurious reflections to the detector, whilst not having too much of an adverse effect on the amount of main reflections which reach the detector, by very precisely setting the radius of the pin-hole. However, there is still a trade-off or compromise, in the sense that the radius of the pinhole is set within a range which gives the best possible (but not ideal) of both worlds: if the radius of the pin-hole were set to maximise the intensity of main reflections reaching the detector, there would be an unacceptable proportion of spurious reflections also reaching the detector, whereas if the pin-hole radius were set to minimise the intensity of spurious reflections reaching the detector, then this would also have an adverse effect on the intensity of main reflections being detected. Instead, a compromise is proposed in U.S. Pat. No. 6,385,157.

We have now devised an improved arrangement, which operates to actively eliminate at least a large proportion of the spurious reflections from a reflected beam prior to retrieval of the data therefrom, thereby minimising cross-talk (and improving signal-to-noise ratio) and improving the quality of the reproduced data.

Referring to FIG. 1 of the drawings, data retrieval apparatus according to a first exemplary embodiment of the present invention is provided for retrieving data stored on an optical data storage disc having a front surface 5, a first data recording layer 6 and a second data recording layer 7. It will be appreciated that further data recording layers may be present behind the second data recording layer 7, but these are not shown in FIG. 1 for the sake of clarity. It will further be appreciated that the second data recording layer 7 (or the last data recording layer, in the case that there are more than two data recording layers) may be substantially opaque and highly reflective, but that the other data recording layer(s) 6 need to be partially transparent so that the source radiation can pass through to data recording layers which are located further back in the disc, and also sufficiently reflective to cause radiation incident thereon to be reflected back so that the data carried thereon can be read.

The apparatus comprises an electromagnetic radiation source 1, such as a semiconductor laser, which emits a beam that is directed at a collimator lens 2 so as to produce a beam of parallel radiation. This beam of radiation is converged by a lens 4 into a focal point on the second data recording layer 7. Obviously, the beam must pass through the first data recording layer 6 (and possibly other data recording layers) to reach the second layer 7 and, because the layer 6 is partially reflective, some of the radiation will be reflected back thereby instead of being transmitted through it.

Thus, radiation reflected by data layers 6, 7 (and possibly other data layers) travels back into the system, through the lens 4 and the partially reflective mirror 3, and is incident on a lens 8. The lens 8 acts as a spatial filtering means in the sense that because the spuriously reflected radiation from data layer 6 and the main reflected radiation from data layer 7 have different effective source points, the reflected radiation is incident on the lens 8 with a different vergence.

The lens 8 acts to converge radiation incident thereon to an image point. It is well known that the image distance, which is the distance from the centre of a thin lens to the image point, is dependent on the radius of curvature of the lens surface. It will be clear to a person skilled in the art that the angle between the normal to the curved surface of a lens and the optical axis tends to increase towards its outer edges.

Thus, because the spuriously reflected radiation is incident on the lens 8 with a vergence different from that of the main reflected radiation, the image distance will be different, and therefore the lens 8 converges the radiation reflected by the data layer 7 to an image point 10, and converges the spuriously reflected radiation to an image point 11 which is further away from the lens 8 than the image point 10. Other data layers will, of course, generate reflected radiation which will be converged by the lens 8 to different respective image points.

A screen 9 with a small pin-hole provided generally centrally therein is placed in the plane of the focal point 10 such that substantially all of the radiation reflected by the data layer 7 passes through the pin-hole. The screen 9 is so positioned, however, to block most of the spurious reflected radiation from data layer 6 (and any other data layers provided in the disc): only a small fraction of this spurious reflected radiation can pass through the pin-hole. The beam that passes through the pin-hole, from which most spurious reflections are eliminated, is incident on another collimator lens 12 and then travels further to a detector 13 (not shown).

Thus, in accordance with the first exemplary embodiment of the present invention described above, use is made of a telescope (lenses 8 and 12) and a blocking screen 9 with a pin-hole. This prevents a main proportion of the spuriously reflected portion of the radiation (say, light) from reaching the detector 13. The portion of spuriously reflected light that does reach the detector 13 interferes with the main reflected light and gives rise only to coherent layer-to-layer cross-talk, but incoherent layer-to-layer cross-talk is suppressed.

Referring to FIG. 2 of the drawings, data retrieval apparatus according to a second exemplary embodiment of the present invention is provided for retrieving data stored on an optical data storage disc having a front surface 5, a first data recording layer 6 and a second data recording layer 7. The apparatus according to the second exemplary embodiment is similar in many respects to that of the first exemplary embodiment described above, and the same reference numbers are used in FIG. 2 to denote like features.

Once again, it will be appreciated that further data recording layers may be present behind the second data recording layer 7, but these are not shown in FIG. 2 for the sake of clarity. It will further be appreciated that the second data recording layer 7 (or the last data recording layer, in the case that there are more than two data recording layers) may be substantially opaque and highly reflective, but that the other data recording layer(s) 6 need to be partially transparent so that the source radiation can pass through to data recording layers which are located further back in the disc, and also sufficiently reflective to cause radiation incident thereon to be reflected back so that the data carried thereon can be read.

As with the apparatus according to the first exemplary embodiment described with reference to FIG. 1, the apparatus of FIG. 2 comprises an electromagnetic radiation source 1, such as a semiconductor laser, which emits a beam that is directed at a collimator lens 2 so as to produce a beam of parallel radiation. This beam of radiation is converged by a lens 4 into a focal point on the second data recording layer 7. Obviously, the beam must pass through the first data recording layer 6 (and possibly other data recording layers) to reach the second layer 7 and, because the layer 6 is partially reflective, some of the radiation will be reflected back thereby instead of being transmitted through it.

Thus, radiation reflected by data layers 6, 7 (and possibly other data layers) travels back into the system, through the lens 4 and the partially reflective mirror 3, and is incident on a lens 8. As before, the lens 8 acts as a spatial filtering means in the sense that because the spuriously reflected radiation from data layer 6 and the main reflected radiation from data layer 7 have different effective source points, the reflected radiation is incident on the lens 8 with different vergences.

As before, the lens 8 acts to converge radiation incident thereon to an image point and, because the spuriously reflected radiation is incident on the lens 8 with a vergence different from that of the main reflected radiation, the image distance will be different, and therefore the lens 8 converges the radiation reflected by the data layer 7 to an image point 10, and converges the spuriously reflected radiation to an image point 11 which is further away from the lens 8 than the image point 10. Once again, other data layers will, of course, generate reflected radiation which will be converged by the lens 8 to different respective image points.

A substantially opaque obstruction 9 is placed in the plane of the image point 11 such that substantially all of the spurious radiation reflected by the data layer 6 is blocked from passing any further along the transmission path towards the detector 13. The obstruction 9 is so positioned and of a sufficiently small size, however, to permit most of the main reflected radiation from data layer 7 to continue along the transmission path toward the detector 13. The resultant beam, from which most, if not all, spurious reflections are eliminated, is incident on another collimator lens 12 and then travels further to a detector 13 (not shown). It will be appreciated that further obstructions 9 may need to be provided for the reverse situation in which the radiation beam is focused on data layer 6, so that the reflected beam from data layer 6 is the information carrying fraction of the light, and the reflected beam from layer 7 is the spurious fraction of the light that needs to be blocked. Even more obstructions 9 are needed, if additional data layers are present in the optical storage disc, such obstructions being provided at the image point of the spurious reflection from each of such additional data recording layers.

Thus, the apparatus according to a second exemplary embodiment of the present invention, and described with reference to FIG. 2, makes use of the same form of telescope as that described with reference to FIG. 1, but the blocking screen 9, used in the embodiment of FIG. 1 at the focal point of the radiation reflected from the data layer 7 required to be read, is replaced by an obstruction at the or each focal point of the spurious radiation reflected back from the or each other data recording layer and passed through the spatial filter means, including the lens 8. Such obstructions are intended to block the spuriously reflected portion completely. In the illustrated embodiment, the part of the main reflection travelling close to the optical axis is likely to be blocked as well. However, this does not pose a particularly serious problem as no relevant information is likely to be present in that part of the radiation signal. An advantage of this second exemplary embodiment is that the coherent cross-talk referred to with reference to the embodiment of FIG. 1 is also eliminated.

In yet another exemplary embodiment of the present invention may comprise the optical apparatus illustrated in, and described with reference to FIG. 1, without the screen 9 having the pin-hole therein. Instead the lens 12 may be eliminated all together so that the detector 13 is located closer to the lens 8, possibly at substantially the same position as the screen 9, i.e. substantially at the image point 10 of the main portion of the reflected beam. As a result, the radiation beam passing through the lens 8 will comprise a central portion which is the main reflected portion of the beam, and a surrounding portion which is the spurious reflected portion.

Thus referring to FIG. 3, the radiation beam incident on the detector 13 consists of a central main portion 15 of reflected light and the spurious portion 20 of the reflected light surrounding it. The detector 13 in this case consists of an outer segment 30 and an inner segment 40, which generate intensity signals I3 and I4 respectively. The apparatus is arranged and configured such that the main portion 15 of the radiation beam is incident only on the inner segment 40 of the detector 13, whereas the spurious portion is incident on both segments 30, 40. It will be appreciated that the spurious portion will generally occupy a much larger area (20) at the detector surface than the main portion (15). In the illustrated embodiment, the area of the two segments 30, 40 is tuned so that the contribution of the spurious reflection to the generated intensity signals I3 and I4 is equal. Thus, the spurious contribution to the radiation incident on the detector 13 can be substantially eliminated by taking the difference signal $I=I4-I3.$ However, if the contribution of the spurious reflection to the generated intensity signals I3 and I4 is not equal, the spurious portion of the radiation can be substantially eliminated by taking I=I4−kI3, where k is an adjustable gain factor.

It will be appreciated that the third exemplary embodiment of the invention is effectively an electronic version of the opto-mechanical embodiment described with reference to FIG. 1 of the drawings and, as such, only the incoherent layer-to-layer cross-talk is eliminated; the fraction of the spurious light that interferes with the main portion is not eliminated.

It will be further appreciated that each of the segments 30, 40 can be subdivided into a number of sub-segments for other purposes, for example, into quadrants to allow for the measurement of focus and tracking error signals. There are a number of techniques for generating such signals which will be well known to a person skilled in the art, and the present invention is not intended to be limited in this regard.

In summary, the present invention provides an optical device for reading out multi-layer optical storage discs with spatial filtering, i.e. i) means that (substantially) prevent the spuriously reflected portion of the light from reaching the detector while allowing the main reflected portion of the light to reach the detector, or ii) a detector comprising of at least two segments such that the signal due to the spuriously reflected portion of the light can be eliminated from the relevant read-out signals.

Embodiments of the present invention have been described above by way of example only, and it will be apparent to a person skilled in the art that modifications and variations can be made to the described embodiments without departing from the scope of the invention as defined by the appended claims. Further, in the claims, any reference signs placed between parentheses shall not be construed as limiting the claim. The term "comprising" does not exclude the presence of elements or steps other than those listed in a claim. The terms "a" or "an" does not exclude a plurality. The invention can be implemented by means of hardware comprising several distinct elements, and by means of a suitably programmed computer. In a device claim enumerating several means, several of these means can be embodied by one and the same item of hardware. The mere fact that measures are recited in mutually different independent claims does not indicate that a combination of these measures cannot be used to advantage.

The invention claimed is:

1. Data retrieval apparatus for retrieving data stored on an information record medium having a plurality of record layers, the apparatus comprising means for irradiating a first record layer with electromagnetic radiation, a detector for receiving an electromagnetic radiation beam reflected back from said information record medium and for retrieving said data therefrom, said radiation beam comprising radiation reflected back from said first layer and radiation reflected back from one or more of the other layers of the information record medium, the apparatus further comprising spatial filter means arranged and configured to spatially filter said radiation beam so as to cause the radiation reflected by said first record layer and said radiation reflected by any of the other record layers of the information record medium to be spatially separated, and means for selectively eliminating at least a substantial portion of said radiation reflected back from said other record layers from said radiation beam prior to retrieval therefrom of said data.

2. Apparatus according to claim 1, wherein said spatial filter means includes an optical element arranged and configured to converge the radiation reflected by the first record layer to a first image point and the radiation reflected back from the one or more record layers to one or more respective second image points, different from said first image point.

3. Apparatus according to claim 2, wherein said optical element comprises a lens.

4. Apparatus according to claim 2, further comprising obstruction means located in the radiation transmission path between the spatial filter means and the detector.

5. Apparatus according to claim 4, wherein said obstruction means comprises a screen having an aperture therein, the screen being located such that the aperture is at or adjacent to the first image point, such that the radiation reflected back from the first record layer is permitted to pass through the aperture to the detector and at least a substantial portion of the radiation reflected back to the one or other record layers is prevented from being transmitted to the detector by the screen.

6. Apparatus according to claim 4, wherein said obstruction means is located at or adjacent to the or each second image point such that radiation reflected back from the respective one or more other record layers is prevented from being transmitted to the detector, whereas the radiation reflected back from the first record layer is permitted to be transmitted to the detector.

7. Apparatus according to claim 1, wherein said detector is divided into at least two segments, and arranged and configured such that a main portion of the spatially filtered radiation beam consisting of radiation reflected back from the first record layer is incident only on a first segment of the detector, and another portion of the spatially filtered radiation beam consisting of radiation reflected back from the one or more other record layers is incident on at least the first and a second segment of the detector.

8. Apparatus according to claim 7, wherein a substantial portion of the radiation reflected back from the other record layers is eliminated by calculating a first radiation intensity signal in respect of the first segment and a second intensity signal in respect of the second segment, and subtracting the second intensity signal from the first intensity signal.

9. Apparatus according to claim 2, further comprising a collimator element in the radiation transmission path between the first image point and the detector for collimating the radiation beam prior to transmission thereof to the detector.

10. A method of retrieving data stored on an information record medium having a plurality of record layers, the method comprising irradiating a first record layer with electromagnetic radiation, receiving an electromagnetic radiation beam reflected back from said information record medium and retrieving said data therefrom, said radiation beam comprising radiation reflected back from said first layer and radiation reflected back from one or more of the other layers of the information record medium, the method further comprising spatially filtering said radiation beam so as to cause the radiation reflected by said first record layer and said radiation reflected by any of the other record layers of the information record medium to be spatially separated, and selectively eliminating at least a substantial portion of said radiation reflected back from said other record layers from said radiation beam prior to retrieval therefrom of said data.

* * * * *